C. WEINEIS.
MILK-COOLER AND STRAINER.

No. 175,397. Patented March 28, 1876.

WITNESSES:
Francis McArdle.
John Goethals

INVENTOR:
C. Weineis
BY
ATTORNEYS.

UNITED STATES PATENT OFFICE.

CHARLES WEINEIS, OF BLOOMINGDALE, ILLINOIS.

IMPROVEMENT IN MILK COOLERS AND STRAINERS.

Specification forming part of Letters Patent No. 175,397, dated March 28, 1876; application filed March 6, 1876.

*To all whom it may concern:*

Figure 1:
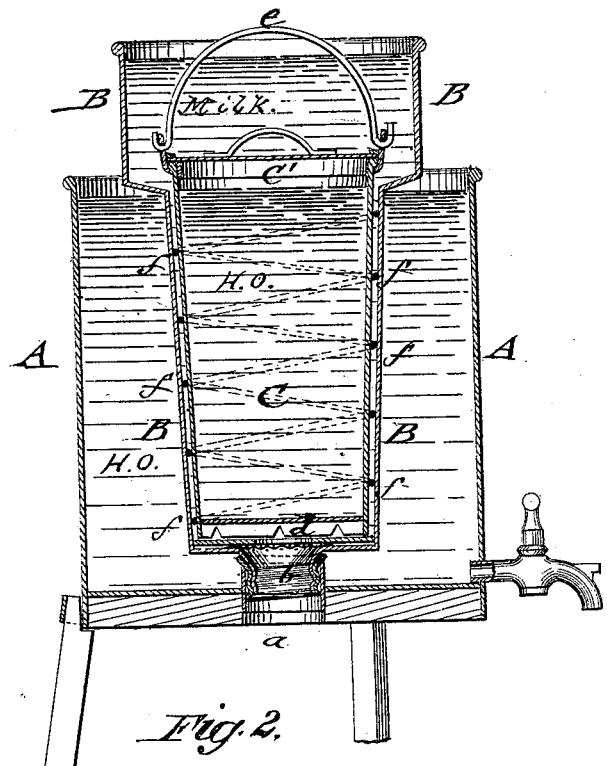
Figure 2:
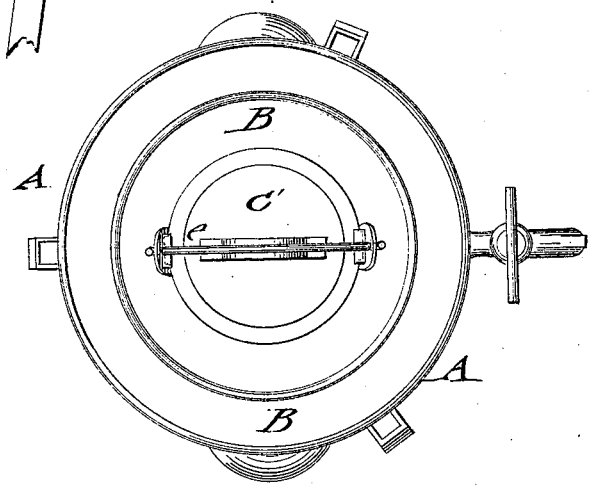

Be it known that I, CHARLES WEINEIS, of Bloomingdale, in the county of Du Page and State of Illinois, have invented a new and Improved Milk Cooler and Strainer, of which the following is a specification:

In the accompanying drawing, Figure 1 represents a vertical central section of my improved milk cooler and strainer, and Fig. 2 is a top view of the same.

Similar letters of reference indicate corresponding parts.

My invention relates to an improved milk cooler and strainer, by which any quantity of milk may be cooled in quick and effective manner for transportation, the cooler allowing also the ready detaching and cleaning of the parts.

The invention consists of an outer water-receptacle, a milk-receiver, with bottom strainer and threaded tube screwing into the bottom tube of the outer receptacle, and of an interior cooling-can, with spiral winding-rib, forming the channel for the milk to pass through to the outlet-tube.

In the drawing, A represents the outer cooling can or receptacle, that is made of tin, galvanized iron, or other material, and in any required size, according as larger and smaller quantities of milk have to be passed through the same for cooling previous to being shipped. The outer can A is supported on legs of suitable height, secured to the receptacle above the milk-can, and provided with a central bottom exit-tube, a, into which the threaded bottom tube b of the milk-receiver B screws in perfectly tight manner. A strainer, d, is placed across the outlet-opening of the milk-receiver B, into which an inner cooling can or receptacle, C, is placed. The interior cooling-pan C is hermetically closed by a cover, C′, retained by suitable fastening-lugs, so that the milk placed into the enlarged top part of the receptacle, that rises above the inner cooler, has no chance of entering into the same. The inner cooler C is readily taken out for being refilled, and then replaced by a swinging top bail, e. The milk receiver and interior cooler correspond in shape, and form a narrow space between their walls, which space is divided by a spiral rib, f, of the interior can C, into spiral windings, through which the milk is conducted to the strainer. The spiral rib fits tightly to the walls of the milk-receiver, and conveys the milk from the top part in a thin sheet through the spiral passage of the intermediate space, exposing it from both sides to the action of the cooling water, and delivering it through the bottom tube in a perfectly cool and strained state to the can.

When large quantities of milk are to be cooled, running water passes by means of a faucet through the outer can, while the interior cooler is supplied from time to time with cold water.

The outlet-tube may be provided with a stop-cock to interrupt the flow of milk, when required. The interior can and milk-receiver may be detached from the outer can, so that all the parts may be separately and conveniently cleaned to be ready for use at any time.

Having thus described my invention, I claim as new and desire to secure by Letters Patent—

A milk cooler and strainer for preparing milk for transportation, consisting of an outer cooling-receptacle, with bottom exit-tube, a milk-receiver, with bottom strainer and exit-tube placed therein, and an interior cooler, forming, by a spiral rib, a narrow passage for the milk to the outlet-tube, all arranged and applied substantially as set forth.

CHARLES WEINEIS.

Witnesses:
  J. R. DUNNING,
  GEORGE WALLIS.